United States Patent [19]

Hickman, Sr. et al.

[11] 4,077,500
[45] Mar. 7, 1978

[54] ANNULAR SINGLE PISTON BRAKE ARRANGEMENT

[75] Inventors: Donald A. Hickman, Sr., Decatur; John H. Hrabak, Pana; Paul C. Rosenberger, Decatur, all of Ill.

[73] Assignee: Caterpillar Tractor Co., Peoria, Ill.

[21] Appl. No.: 745,506

[22] Filed: Nov. 26, 1976

Related U.S. Application Data

[63] Continuation of Ser. No. 608,294, Aug. 27, 1975, abandoned.

[51] Int. Cl.² .............................................. F16D 65/14
[52] U.S. Cl. .................................. 188/106 P; 92/107;
 92/130 A; 188/170; 188/264 F; 188/366;
 192/70.12; 192/91 A; 303/6 M; 303/71
[58] Field of Search ................... 188/71.6, 170, 106 F,
 188/106 P, 366, 72.6, 264 E, 264 F; 303/71, 6
 M; 192/91 A, 113 B, 70.12; 92/107, 108, 130 A

[56] References Cited

U.S. PATENT DOCUMENTS

| 3,613,839 | 10/1971 | MacDuff | 188/170 |
| 3,680,666 | 8/1972 | Sommer | 188/170 |
| 3,941,219 | 3/1976 | Myers | 188/71.6 X |

*Primary Examiner*—George E. A. Halvosa
*Attorney, Agent, or Firm*—Charles E. Lanchantin, Jr.

[57] ABSTRACT

An annular single piston brake arrangement is disclosed for selective holding engagement of a rotatable member of a drive train. The brake arrangement includes a support structure, an annular brake piston axially reciprocably and nonrotatably mounted within the support structure, a plurality of springs mounted intermediate the support structure and the brake piston for biasing it concentrically toward peripheral brake holding engagement of the rotatable member, a fluid retractor for holding the brake piston in a disengaged condition overcomingly against the action of the springs, and a fluid actuator for biasing the brake piston concentrically towards peripheral brake holding engagement of the rotatable member.

6 Claims, 1 Drawing Figure

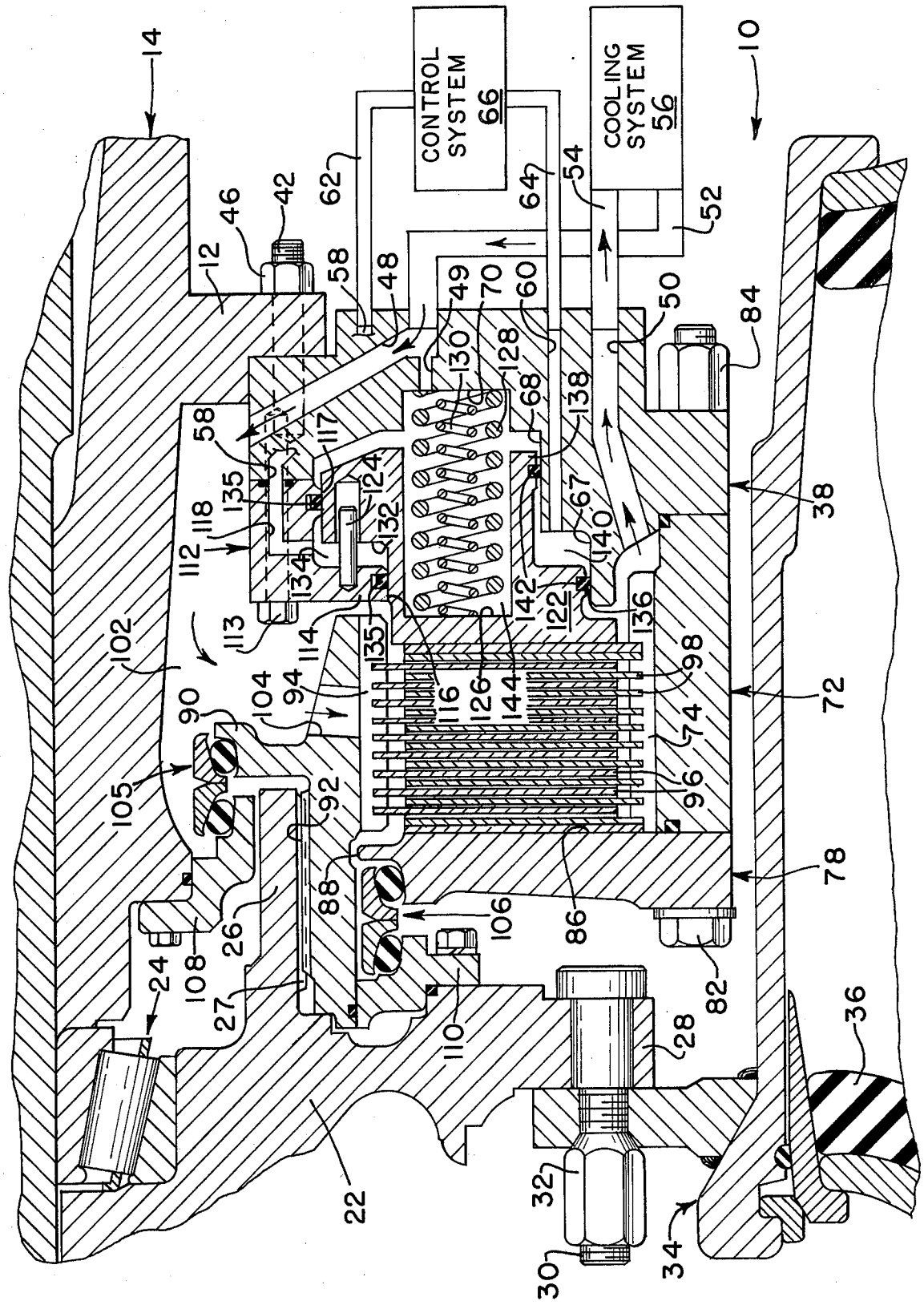

ANNULAR SINGLE PISTON BRAKE ARRANGEMENT

CROSS-REFERENCE TO RELATED APPLICATION

This is a continuation of Application Ser. No. 608,294 filed Aug. 27, 1975, now abandoned.

BACKGROUND OF THE INVENTION

Fluid operated brake arrangements for large material hauling vehicles, such as trucks and the like, are being continually improved in an attempt to achieve safe and effective braking under severe operating conditions. Representative of these braking arrangements are the following U.S. Pat. Nos.: U.S. Pat. No. 2,928,504, issued Mar. 15, 1960 to E. H. Hahn et al U.S. Pat. No. 3,547,233, issued Dec. 15, 1970 to J. H. Girvan, U.S. Pat. No. 3,547,234, issued Dec. 15, 1970 to C. F. Cummins et al, U.S. Pat. No. 3,613,839, issued Oct. 19, 1971 to S. I. MacDuff, U.S. Pat. No. 3,770,085, issued Nov. 6, 1973 to E. R. Cottingham.

While these brake arrangements have advanced the state of the art, they have not effectively integrated service braking with emergency and/or parking braking in a single annularly compact and economical package. For example, it is substantially imperative that such brake arrangements be small in size, while having a relatively high multi-purpose capacity in order for them to fit within a wheel rim and encirclingly around an axle housing where space is at a premium. Another desirable characteristic is the ability to easily install or remove them as a modular package.

In the past, in order to increase the capacity of an individual brake arrangement, there has been a tendency to incorporate a larger number of separate brake engagement mechanisms about the periphery of the member to be braked. This not only requires a larger number of the same parts at added expense, but also presents the potential problem of unequal peripheral loading of the braked member, should service problems develop in one or more of the individual mechanisms. Furthermore, many of these mechanisms are complex and costly to manufacture.

Another major deficiency with respect to most prior art brake arrangements is that they do not make any provision for supplying a cooling fluid to the energy absorbing surfaces. As a result, both the service life and the capacity of the brake arrangement is adversely affected.

SUMMARY AND OBJECTS OF THE INVENTION

Accordingly, it is an object of the present invention to provide an economical annular single piston brake arrangement which is engageable for individual service braking as well as for emergency and/or parking braking in a relatively safe and responsive manner.

Another object is to provide a relatively high capacity brake arrangement of the character described which has a minimum number of parts and is both radially and axially compact so that it can be disposed annularly within a wheel rim of a vehicle.

Another object is to provide a brake arrangement of the aforementioned type which is fluid-cooled in order to increase its energy-absorption capability and service life.

Other objects and advantages of the present invention, including the ability to easily install or remove the brake arrangement as a unitary package, will become more readily apparent upon reference to the accompanying drawings and the following description.

BRIEF DESCRIPTION OF THE DRAWING

The drawing is a fragmentary section of the annular single piston brake arrangement of the present invention as taken through the axis of a vehicle axle housing and showing the lower half thereof including a portion of a wheel rim arrangement and schematically illustrated control and cooling systems which are associated therewith.

DESCRIPTION OF PREFERRED EMBODIMENT

With reference to the drawing, the annular oil-cooled single piston brake arrangement 10 of the present invention is axially mounted outboard, or to the left when viewing the drawing, of a radially extending flange 12. In the instant example, such flange is an integral part of a conically tapered axle housing 14 such as is found on a relatively large earthmoving truck or the like. A vehicle wheel hub or drive train member 22 is rotatably supported on the axle housing to the outside of the annular brake arrangement by an antifriction bearing 24. The wheel hub has an axially inwardly extending flange 26 with an external spline 27 thereon, and a radially outwardly extending flange 28. A wheel rim arrangement generally identified by the reference numeral 34 is secured to the flange 28 by a plurality of circumferentially spaced lug bolts 30 and associated nuts 32, and a tire 36 is sealingly mounted thereon. Upon screw threadably removing the nuts, the tire and wheel rim arrangement may be pulled axially outwardly as a unit from the lug bolts and the axle housing for servicing purposes in the usual manner.

The brake arrangement 10 includes an inner end plate 38 removably secured to flange 12 of the axle housing 14 as by a plurality of threaded studs 42 anchored to the end plate and extending axially inwardly through the flange for screw threaded receipt of a plurality of retaining nuts 46 thereon. Formed in this end plate are a radially inwardly extending inlet passage 48 and an axially oriented branch passage 49, as well as an outlet passage 50 axially extending therethrough, which are respectively in fluid communication with an inlet conduit 52 and an outlet conduit 54. These conduits are operationally connected to a cooling system 56 for the purpose of normally continuously circulating a cooling fluid through the brake arrangement. In a similar manner, the inner end plate has a parking brake passage 58 and a service brake passage 60 therethrough which are respectively connected with a conduit 62 and a conduit 64 for selective fluid communication with a brake control system 66. Furthermore, the inner end plate is internally stepped to define a piston-receiving outer counterbore 67 and an inner counterbore 68 and a plurality of substantially equally circumferentially spaced spring-receiving cavities 70 which open axially outwardly on the inner end wall of the inner counterbore.

Centrally disposed about the periphery of the brake arrangement 10 is a cylindrical connecting shell 72 having a plurality of internal teeth 74 formed thereon. The shell extends axially in spanning relation between the inner end plate 38 and an outer end plate 78, and in order to secure them together a plurality of elongated bolts 82 are inserted axially inwardly therethrough which are adapted to screw threadably receive a corresponding plurality of retaining nuts 84 thereon. In this way the outer end plate provides a relatively fixed inner thrust service 86 for clamping engagement of the brake arrangement.

As is clearly illustrated, the outer end plate 78 has a circular aperture 88 defined centrally through it so that it may be disposed in relatively radially closely spaced relation to the external spline 27 of the wheel hub 22. However, a cylindrical connecting drum 90 extends axially outwardly through the annular clearance within this aperture so that an internal spline 92 thereon is engaged with the external spline of the wheel hub. Consequently, the connecting drum rotates with vehicle movement and is provided with a plurality of external teeth 94 on which are keyed a plurality of brake discs 96. These rotatable discs are interleaved with a plurality of brake plates 98 which are similarly keyed to the internal teeth of the support structure shell 72.

In accordance with one aspect of the invention, the brake arrangement 10 is fully peripherally cooled by the circulation of fluid from the inlet conduit 52, the inlet passage 48, to an internal annular chamber 102, and thence radially outwardly through a plurality of passages 104 in the connecting drum 90 and the interleaved brake discs 96 and brake plates 98. Subsequently, the fluid is routed axially inwardly back to the cooling system 56 by way of the outlet passage 50 and outlet conduit 54. In order to contain this fluid, an annular internal seal arrangement 105 and an annular external seal arrangement 106 are required. The elements of the internal seal arrangement centrally experience relative rotary motion by virtue of their mounting between an adapter member 108 secured to the axle housing 14 and the rotatable connecting drum 90, while the external seal arrangement elements experience similar relative rotary motion by virtue of their mounting between the outer end plate 78 and another adapter member 110 secured to the wheel hub 22. Such seal arrangements are generally disclosed in the aforementioned Cummins et al patent assigned to the assignee of the present invention.

The brake arrangement 10 also includes a radially inner, piston entrapping housing member 112 which is tightly secured against the inner end plate 38 by a plurality of retaining bolts 113 which are inserted therethrough for screw threaded engagement solely with the end plate. As is clearly shown, such housing member has a radially outwardly extending flange 114 which thereby serves to stepably define a radially outer cylindrical surface 116 thereon, and which surface is juxtaposed axially outwardly of a radially inner cylindrical surface 117. Furthermore, the housing member is secured to the inner end plate in such a manner that an inlet passage 118 formed therein is aligned with the parking brake passage 58.

More particularly, actuation of the brake arrangement 10 is accomplished by axial reciprocating movement of a single annular brake piston 122 which is nonrotatably secured to the housing member 112 through a piston retaining and aligning dowel 124 rigidly secured to the housing member. A plurality of spring-receiving cavities 126 are formed in the piston which open axially inwardly in general alignment with the cavities 70 of the inner end plate. In this way a nested plurality of relatively high capacity compression springs 128 and 130 are adapted to be seated intermediate the cavities 70 and 126 to urge the piston leftwardly, when viewing the drawing, towards a fully engaged position. The brake piston also includes an axially outwardly facing counterbore 132 radially inwardly thereof which is disposed in axial slidable cooperating relation with the stepped surfaces 116 and 117 of the housing member 112 to thereby define a fluid retractor or parking brake retraction chamber 134 therebetween. A pair of seal rings 135 define the radially outer and inner limits of this chamber and fluid pressure is delivered thereto by way of the inlet passage 118 to normally move the brake piston axially inwardly, or to the right when viewing the drawing, against the opposition of the compression springs.

Radially outwardly thereof the brake piston 122 includes an inwardly facing peripheral step to thereby define an outer surface 136 and an inner surface 138 which are respectively disposed in axial slidable cooperating relation with the counterbores 67 and 68 of the inner end plate 38 so that a fluid actuator or service brake actuation chamber 140 is defined therebetween. A pair of seal rings 142 define the radially outer and inner limits of this chamber and fluid pressure is selectively delivered to, and limitedly relieved therefrom through the passage 60, the inlet conduit 64, and the brake control system 66. Thus, it can be appreciated that with pressurization of the service brake actuation chamber, the brake piston moves axially outwardly to compress the brake discs 96 and the interleaved brake plates 98, against the thrust surface 86 for selective holding engagement of the rotatable wheel hub 22 via the interconnecting drum 90.

Upon inspection of the drawing it will be seen that a spring chamber 144 is defined intermediate the brake piston 122 and the end plate 38, and that the branch passage 49 allows cooling fluid pressure to be communicated thereto. This beneficially results in a force tending to move the piston leftwardly in opposition to the force resulting from substantially the same pressure acting thereon in the internal chamber 102.

OPERATION

While the operation of the present invention is believed clearly apparent from the foregoing description, further amplification will subsequently be made in the following brief summary of such operation. With no fluid pressure present in either of the chambers 134 or 140, due to deactivation of the control system 66, such as would normally take place under vehicle parking conditions, the compression springs 128 and 130 apply a relatively substantial force serving to bias the brake piston 122 leftwardly when viewing the drawing. This forces the brake piston against the stack of interleaved brake discs 96 and brake plates 98 to compress them against the thrust surface 86 of the outer end plate 78 substantially as shown. In this way the discs are frictionally coupled to the support structure including the shell 72, the end plate 38 and the axle housing 14, to thereby hold the connecting drum 90, wheel hub 22 and the wheel rim arrangement 34 fixed. In the instant example, the resulting clamping force is in the order of approximately 20,000 pounds.

It is contemplated that provision is made in the brake control system 66 for supplying a predetermined fluid pressure, for example 400 psi, to the parking brake retraction chamber 134, or alternately, depressurizing the chamber through the inlet passage 118, the passage 48 and the conduit 62. Operation of the brake arrangement 10 is subsequently understood by actuating the cooling system 56 simultaneously with vehicle start-up to supply cooling fluid circulatingly therethrough. Since the cooling fluid is maintained at a pressure of approximately 15 psi, such pressure is communicated through the branch passage 49 to the spring chamber 144 so that the brake piston is biased toward its engaged position. Simultaneously, however, the same pressure is available in the internal chamber 102 to urge it towards its disengaged position. In accordance with one aspect of the invention, the piston area between the cylindrical surfaces at 117 and 138 is larger than the area intermediate the surfaces at 116 and 136, with the result that a differential force is generated, in the instant example approximately 300 lbs, which serves to bias the piston towards engagement. In the event of a failure of the control system 66 and/or any inadvertent depressurization of the retraction chamber 134, this relatively small differential force due to the circulation of cooling fluid would not significantly affect the automatic application of the brake arrangement by way of the compression springs 128 and 130.

Pursuant to the present invention the retraction chamber 134 is depressurized to allow automatic engagement of the brake piston 122 via the compression springs 128 and 130 for emergency or parking braking selectively by the vehicle operator. However, when a vehicle traveling mode is desired, the operator activates the control system 66 to supply the aforementioned 400 psi pressure fluid to the retraction chamber. This biases the piston toward disengagement with a force approaching approximately 30,000 pounds in the instant example. This overcomes the spring force and allows free rotary movement of the vehicle drive train.

When service braking is desired, the vehicle operator manipulates the control system 66 to selectively supply pressure to the brake actuation chamber 140 through the conduit 64 and the passage 60, for example, up to 600 psi, in accordance with the degree of braking desired. In the instant embodiment a service braking force of over 25,000 pounds may thus be generated. If, under emergency conditions, even greater stopping capability is desired the retraction chamber may be depressurized as described above through the control system to substantially double this clamping force by adding the force of the compression springs 128 and 130 thereto.

In accordance with one aspect of the invention, the control system 66 allows only a predetermined volume of fluid to be exhausted from the service brake actuation chamber 140 upon the selective release of service braking by the vehicle operator. This permits limited retracting travel of the brake piston 122 axially away from the previously tightly clamped brake discs 96 and brake plates 98, and in a very desirable manner serves to automatically adjust any slack to a predetermined value to thereby improve service braking response upon the reengagement thereof. For example, the volume of fluid exhausted from the actuation chamber may be limited to an amount sufficient to provide approximately 0.005 inch clearance between each of the brake discs 96 and the brake plates 98. This minimizes the drag and horsepower loss therebetween, while simultaneously limiting the maximum amount of service brake piston travel independently of any wear of these discs and plates so that they may be rapidly reengaged.

Because of its construction, the single piston brake arrangement 10 of the present invention may be preassembled before installation on the vehicle axle housing 14 and may be easily removed therefrom as a unit for servicing purposes. In the latter instance, the wheel hub 22 and the associated wheel rim arrangement 34 are removed in the usual manner leaving the connecting drum 90, the seal arrangement 105 and the seal adapter member 108 in place. Removal of this adapter member and seal arrangement thereafter permits free travel of the brake arrangement and drum. Upon disconnecting the conduits 52, 54, 62 and 64, this is accomplished by screw threadably removing the nuts 46 from the mounting studs 42, to allow the brake arrangement to be removed axially outwardly as a unit. Since the bolts 113 hold the piston entrapping housing member 112 tightly to the inner end plate 38, and the bolts 82 and the nuts 84 clamp the shell 72 and the outer end plate 78 thereto, the springs 128 and 130 urge the brake piston 122 leftwardly when viewing the drawing to hold the brake discs 96 and brake plates 98 against the thrust surface 86 in axially aligned clamped relation. Thus, a modular package is provided that can be easily removed for servicing purposes.

It is to be noted that further disassembly of the modular brake arrangement 10 is possible without removal of the brake piston 122 or the compression springs 128 or 130. In order to do this, the nuts 84 are screw threadably released from the bolts 82 so that the outer end plate 78 and the shell 72 may be removed axially away from the inner end plate 38. This provides free access to the brake discs 96 and brake plates 98 as thereafter they may be slipped axially off of the internal teeth 74. At the same time the piston 122 is urged outwardly toward the flange 114 by the compression springs where it is abuttingly contained thereby.

Therefore, the single piston brake arrangement 10 of the present invention is seen to be conveniently installed or removed as a modular package closely from the periphery of an axle housing. And further, it is seen that it can achieve service braking at a predetermined force corresponding to a maximum pressure in the service brake actuating chamber 140, parking braking or emergency braking at a force of approximately 80% of the predetermined force solely and automatically through the compression springs, or emergency braking of up to 180% of this predetermined force in the relatively limited annular spacing between the axle housing and the wheel rim arrangement. In addition, this compactly integrated multi-capacity structure is fluid-cooled to provide an extended service life thereto.

While the invention has been described and shown with particular reference to a single embodiment, it will be apparent that variations might be possible that would fall within the scope of the present invention, which is not intended to be limited except as defined in the following claims.

What is claimed is:

1. An annular single piston brake arrangement, for selective holding engagement of a rotatable member of a drive train, comprising:
   a support structure;
   an annular brake piston mounted for axial movement within the support structure and defining therewith a service brake actuation chamber, a parking brake retraction chamber, and a separate spring chamber;
   spring means disposed within the spring chamber and connected to the support structure for biasing the brake piston concentrically toward peripheral brake holding engagement of the rotatable member;

retraction means for supplying fluid to the parking brake retraction chamber for biasingly overcoming the force of the spring means and holding the brake piston in a disengaged position;

actuating means for supplying fluid to the service brake actuation chamber for selectively biasing the brake piston concentrically toward peripheral brake holding engagement of the rotatable member;

seal means disposed intermediate the support structure and the rotatable member for defining an internal chamber therebetween;

means for continually supplying a cooling fluid to the internal chamber for cooling the brake arrangement, with such fluid acting to bias the brake piston toward the disengaged position; and means for communicating a fluid to the separate spring chamber for biasing the brake piston toward engagement in opposition to the effect of the cooling fluid in the internal chamber urging the brake piston toward disengagement.

2. The annular single piston brake arrangement of claim 1 wherein the fluid in the separate spring chamber acts upon the brake piston through a first annular piston area to generate an engaging force, and wherein the cooling fluid in the internal chamber acts upon the opposite side of the brake piston through a second annular piston area to generate a disengaging force, with said engaging and disengaging forces being independent of the retraction means and the actuating means.

3. The annular single piston brake arrangement of claim 1 wherein the annular brake piston has a radially inwardly disposed counterbore and a radially outwardly disposed peripheral step, and with the counterbore and the step defining with the support structure a substantially radially aligned arrangement of the service brake actuation chamber and the parking brake retraction chamber.

4. The annular single piston brake arrangement of claim 1 wherein a first annular seal ring and a second annular seal ring define the radially outer and radially inner limits of the service brake actuation chamber, and wherein a third annular seal ring and a fourth annular seal ring define the radially outer and radially inner limits of the parking brake retraction chamber, with the second and fourth annular seal rings respectively defining the radially outer and radially inner limits of a first annular piston area opening on the separate spring chamber, and with the first and third annular seal rings respectively defining the radially outer and radially inner limits of a second annular piston area opening on the internal chamber.

5. The annular single piston brake arrangement of claim 4 wherein the first annular piston area is larger than the second annular piston area.

6. The annular single piston brake arrangement of claim 4 wherein the cooling fluid in the internal chamber acts upon the second annular piston area and the fluid in the separate spring chamber acts upon the first annular piston area to generate opposing forces on the annular brake piston which are independent of the retraction means and the actuating means.

* * * * *